US007089361B2

(12) United States Patent
Borkenhagen (10) Patent No.: US 7,089,361 B2
(45) Date of Patent: Aug. 8, 2006

(54) DYNAMIC ALLOCATION OF SHARED CACHE DIRECTORY FOR OPTIMIZING PERFORMANCE

(75) Inventor: John Michael Borkenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 10/636,059

(22) Filed: Aug. 7, 2003

(65) Prior Publication Data
US 2005/0033919 A1   Feb. 10, 2005

(51) Int. Cl.
*G06F 12/00* (2006.01)
(52) U.S. Cl. .................... 711/129; 711/173; 711/153; 711/141; 711/146
(58) Field of Classification Search .............. None
See application file for complete search history.

(56) References Cited

U.S. PATENT DOCUMENTS

| | | | | |
|---|---|---|---|---|
| 5,752,255 A * | 5/1998 | Jarvis ............................. | 711/3 |
| 5,946,709 A * | 8/1999 | Arimilli et al. ............. | 711/119 |
| 6,457,100 B1 * | 9/2002 | Ignatowski et al. ......... | 711/119 |
| 6,470,442 B1 * | 10/2002 | Arimilli et al. ............... | 712/32 |
| 6,480,941 B1 * | 11/2002 | Franke et al. ............... | 711/153 |
| 6,516,387 B1 * | 2/2003 | Auracher .................... | 711/123 |
| 6,560,674 B1 * | 5/2003 | Hosogi et al. .............. | 711/118 |
| 6,662,216 B1 * | 12/2003 | Arimilli et al. ............. | 709/218 |
| 6,662,272 B1 * | 12/2003 | Olarig et al. ............... | 711/129 |
| 6,725,336 B1 * | 4/2004 | Cherabuddi .................. | 711/129 |
| 6,725,344 B1 * | 4/2004 | Pawlowski .................. | 711/146 |
| 6,901,485 B1 * | 5/2005 | Arimilli et al. ............. | 711/135 |
| 2002/0019913 A1 * | 2/2002 | Shimizu et al. ............. | 711/141 |
| 2003/0009631 A1 * | 1/2003 | Arimilli et al. ............. | 711/135 |
| 2004/0003184 A1 * | 1/2004 | Safranek et al. ............ | 711/146 |
| 2004/0230750 A1 * | 11/2004 | Blake et al. ................ | 711/146 |

OTHER PUBLICATIONS

Borkenhagen et al., IBM U.S. Appl. No. 10/403,157 (ROC920020136US1), filed Mar. 31, 2003, "Configurable Directory Allocation".

* cited by examiner

*Primary Examiner*—Mano Padmanabhan
*Assistant Examiner*—Kaushik Patel
(74) *Attorney, Agent, or Firm*—Robert R. Williams (57) ABSTRACT

Methods, apparatus, and program product are disclosed for use in a computer system to provide for dynamic allocation of a directory memory in a node memory controller in which one or more coherent multiprocessor nodes comprise the computer system. The directory memory in a node is partitioned between a snoop directory portion and a remote memory directory portion. During a predetermined time interval, snoop directory entry refills and remote memory directory entry refills are accumulated. After the time interval has elapsed, a ratio of the snoop directory entry refills to the number of remote memory directory entry refills is computed. The ratio is compared to a desired ratio. Respondent to a difference between the ratio and the desired ratio, adjustments are made to the allocation of the memory directory between the snoop directory and the remote memory directory.

18 Claims, 6 Drawing Sheets

DYNAMIC ALLOCATION OF SHARED CACHE DIRECTORY FOR OPTIMIZING PERFORMANCE

RELATED INVENTIONS

The present invention is related to application Ser. No. 10/403,157 US20040193810A1filed Mar. 31, 2003, entitled "Configurable Directory Allocation", having a common assignee.

BACKGROUND OF THE INVENTION

1. Field of the Invention

The present invention generally relates to computers. More particularly, the present invention relates to computers that may have more than a single node, and where each node has more than a single processor.

2. Description of the Related Art

Early computer systems comprised a single processor, along with the processor's associated memory, input/output devices, and mass storage systems such as disk drives, optical storage, magnetic tape drives, and the like.

As demand for processing power increased beyond what was possible to build as a single processor computer, multiple processors were coupled together by one or more signal busses. A signal bus comprises one or more electrically conducting elements. For example a signal bus might simultaneously carry 64 bits of data from a first processor to a second processor. Many signal busses are logically subdivided and have an address bus portion, a control bus portion, and a data bus portion. Typically, signal busses in large computer systems further comprise parity or error correcting code (ECC) conductors to detect and/or correct errors that may occur during signal transmission.

Further demand for processing power forced computer designers to create computer systems having more than one node, where a node typically comprised more than one processor, each processor having several levels of cache dedicated to that processor. Each node has a relatively large amount of memory that has coherency managed by hardware. Computer systems having the capability to expand from a single node to many nodes is also advantageous in that a customer can start with a small—perhaps a single-node—system, and purchase more nodes as the customer's need for processing power grows. Such computer systems are scalable, in that the power of the computer systems scales with the customer's need for processing power.

Such a computer system typically features multiple processors on each node. If all processors on a node share a common processor bus, each processor in the node can "snoop" the processor bus for address references of load and store commands issued by other processors in the node to ensure memory coherency. Each processor in the node can then check and update the state of cache lines owned by each processor. For example, within a particular node, if a first processor makes a reference to a cache line currently in an L3 cache of a second processor, the second processor will recognize the reference and will send the cache line of the processor bus to the first processor, without the need for passing the cache line into and subsequently from a memory controller also coupled to the processor bus. Snoop cache techniques are well-known in the computer industry.

A problem exists in transmitting a high volume of requests and data over a processor bus shared by multiple processors. Bandwidth of data coming to or from an L4 memory, as well as requests for loads or stores, is shared by the processors sharing the processor bus and this sharing of bandwidth limits processing throughput of the node and therefore the computer system. The problem is further aggravated by the required electrical topology of the processor bus. For fastest data transmission, a very simple electrical configuration of a bus is implemented, ideally "point-to-point", in which the bus couples only two units; for example, a single processor to a memory controller. As more couplings are added to the processor bus, the processor bus gets physically longer, and discontinuities of the physical connections introduce reflections on the processor bus, forcing a longer time period for each transmission of data. Therefore, the number of processors coupled to a processor bus is a performance limiter.

One technique used to limit the number of processors sharing a processor bus provides a separate processor bus for each processor (or, perhaps two processors, if bus topology allows acceptable performance). The following discussion, for simplicity, assumes two processors in a node, each processor having a processor bus coupled to itself and further coupled to a memory controller. While this technique provides two busses and simplifies the electrical topology of the interconnect, a first processor on a first processor bus can no longer directly "snoop" the load and store requests of a second processor coupled to the other processor bus in the node. The Memory controller could drive each load and store request seen on the first processor bus onto the second processor bus, and drive each load and store request seen on the second processor bus onto the first processor bus, but such a technique would be extremely wasteful and negate most of the advantages expected from providing a separate bus to each processor. To eliminate the need to drive each processor's load and store requests to the other processor, a snoop directory is typically designed as a fixed portion of a directory memory inside of, or coupled to, the memory controller. The snoop directory contains directory entries about cache lines used by any processor in the node. The memory controller uses the snoop directory to filter load and store requests from each processor so that only those load and store requests that the other processor must be aware of, or respond to, are forwarded to the other processor.

Each node must also retain directory entries for cache lines that have been sent to other nodes in the computer system. This information is stored in a remote memory directory in a portion of the directory memory that is not allocated to the snoop directory. In early computer systems, the allocation of directory memory is fixed, regardless of the number of nodes in the computer system. When a computer system is configured having only one node, no remote memory directory is in fact required, causing the memory allocated to the remote memory directory to be wasted. When a large number of nodes are installed in the computer system, the fixed partition allocated for the remote memory directory may be smaller than optimal. Application Ser. No. 10/403,157 is directed to providing a more optimal allocation of directory memory by using the number of nodes in the system as a determinant of the directory memory allocation.

However, depending on workload, an optimal allocation of the directory memory between the snoop directory and the remote memory directory can change. For example, during the day, the computer system might be running transaction data processing on a very large database, in which a relatively large amount of data in the address space of one node is needed by another node, and, therefore, a relatively larger proportion of the directory memory should be allocated to the remote memory directory. At night on the same computer system, perhaps a scientific, numerical intensive, application is run, in which most, if not all, memory requirements of a node are satisfied by memory residing on the node. In such case, an optimal allocation of the directory memory is to allocate very little space to the remote memory directory.

Improvements in software (such as upgrades) might also be a determinant of the optimal allocation of the directory memory. For example, a compiler might generate code that does not make good use of locality of reference. The compiler might scatter data over a wide addressing range, in which case, more data would be needed from the memory addressing space of other nodes in the computer system, and more of the directory memory is optimally allocated to the remote memory directory. If an improved version of the compiler is installed, improvements in use of locality of reference may occur, reducing the number of memory references to other nodes, and therefore reducing the optimal size of the remote memory directory.

In a scalable computer system, optimal allocation of the directory memory also depends on the number of nodes installed. For example, if only one node is installed, the remote memory directory is not needed at all. If a customer adds a second node, the remote memory directory is required, but need not (in most cases) be large. As a third, fourth, fifth (and so on) node is added, more and more data, typically, must be shared between nodes, and therefore, more remote directory entries are needed. The optimal allocation of the directory memory tends to provide for a relatively larger remote memory directory as more nodes are added. Today's computer customer wants processing power on demand. Nodes already physically in the computer system can be enabled dynamically during peak periods and disabled when not required. Directory memory allocation should respond to such enabling/disabling events.

In the emerging world of autonomic computing, the allocation of directory entries between uses would ideally be dynamic to optimize performance for changing workloads with changing locality of reference. For example, in a server application, the virtual machine system management may autonomically detect the need for more or less processors for a given partition running on the virtual machine. The system management would automatically add or subtract processors to that partition across nodes. When a partition crosses a node boundary, its memory locality of reference will change. In this situation, the allocation of directory memory between the snoop directory and the remote memory directory should be adjusted for optimal performance.

Therefore, a need exists to provide a dynamic node directory management system for a computer system having more than one processor per node, the computer system being scalable in the number of nodes installed or used.

SUMMARY OF THE INVENTION

The present invention generally provides methods and apparatus to make better use of a directory memory in a memory controller in a node of a computer system, the node having more than one processor. A node having more than one processor is also called a multiprocessor node. Unless otherwise stated, nodes in this invention mean multiprocessor nodes.

In an embodiment, a node of a computer system has a directory memory that is logically partitioned into a snoop directory portion and a remote memory directory portion, the portion allocations determined dynamically to improve throughput of the computer system.

In an embodiment, a node of a computer system has a directory memory that can be logically partitioned into a snoop directory portion and a remote memory directory portion, the portion allocations determined dynamically at least in part, by a ratio of directory entry refills between the snoop directory portion and the remote memory directory portion.

In an embodiment, the ratio of directory entry refills for the snoop directory portion to the entry refills for the remote directory portion is compared against a desired ratio and the allocation of the directory memory to the snoop directory portion and to the remote memory directory portion is adjusted responsive to the comparison. The desired ratio is predetermined using computer throughput experiments or from theoretical analysis of the computer system.

In an embodiment, a method is disclosed where the number of snoop directory refills and the number of remote memory directory refills are counted over a predetermined period of time. At the end of the predetermined period of time, a ratio of the number of snoop directory refills to the number of remote memory directory refills is computed. The ratio is compared to a desired ratio. Respondent to this comparison, an adjustment of allocation of directory memory into a snoop directory and a remote memory directory is performed subsequent to the end of the predetermined period of time; the sizes of the snoop directory partition and the remote directory partition are determined, at least in part, by the result of the comparison.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Having reference now to the figures, and having provided above a discussion of the art, the present invention will be described in detail.

The present invention generally provides methods and apparatus to make better use of a directory memory in a memory controller in a node of a computer system, the node having more than one processor. In particular, a directory memory in a node is partitioned into a snoop directory portion and a remote memory directory portion. Respective entry refill rates for the snoop directory portion and the remote memory directory portion is a determinant of an allocation size of each portion.

Figure 1:
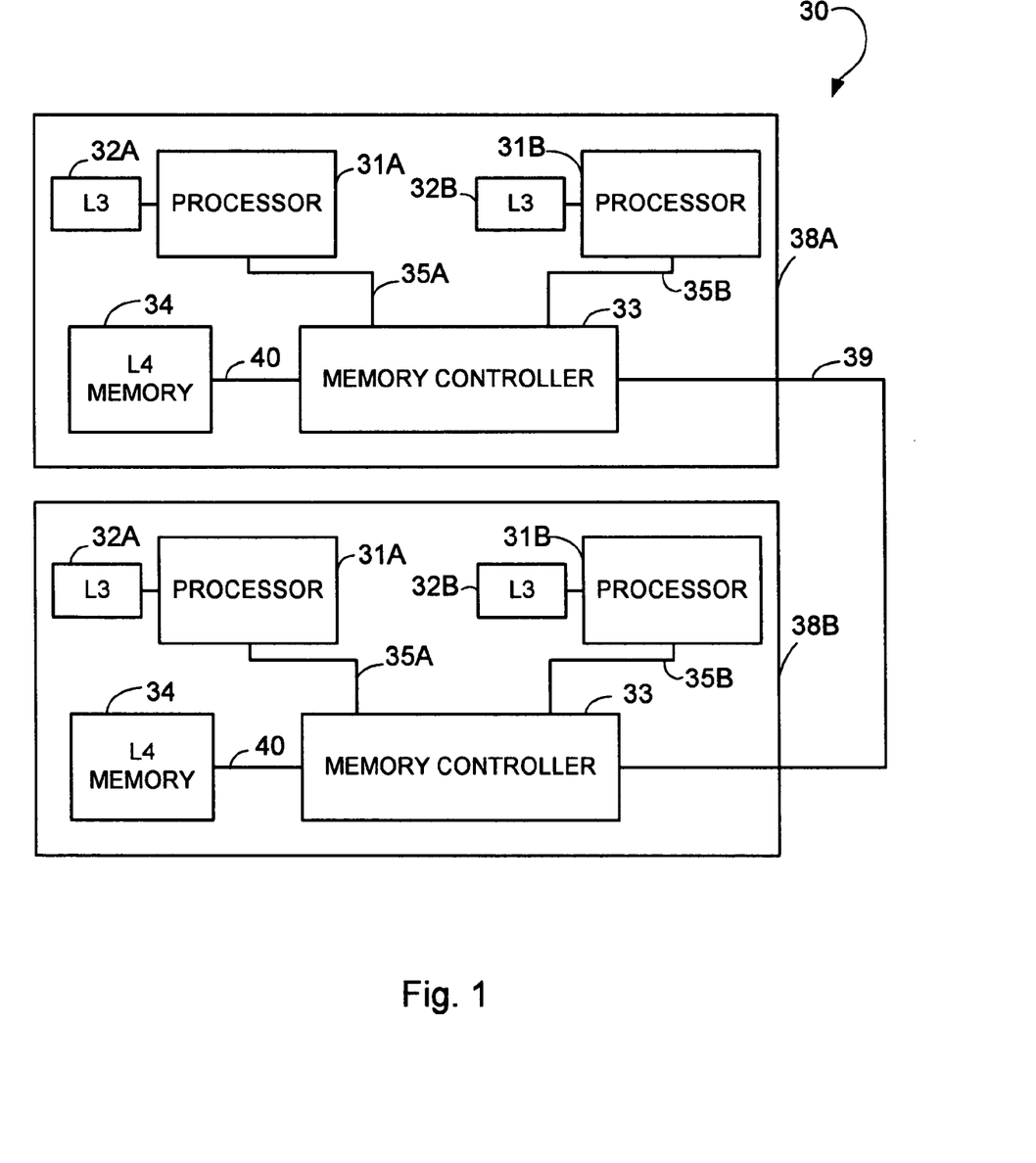
FIG. 1 shows a block diagram of a computer system having more than one node, each node having more than one processor. Each node has a memory controller and a memory.

FIG. 1 shows a computer system generally referred to as 30. Computer system 30 comprises, as shown, two nodes, node 38A and node 38B. In general, computer system 30 can comprise any number of nodes, including only a single node. Computer system 30 may be shipped with only a single node installed, but have additional nodes installed at a later time. Nodes 38A and 38B are installed in node sites (not shown) suitable to mechanically hold nodes, power nodes and interconnect signals to and from nodes. In an embodiment, such a node site is a socket on a Printed Wiring Board (PWB); in another embodiment such a node site is a connector on a motherboard into which a card comprising a node can be plugged. In yet another embodiment, such a node site is a Land Grid Array region on a PWB upon which a node can be installed. In another embodiment, one or more nodes reside on a "drawer" that slide into a "rack". Interconnection between drawers is done by cable connection from one drawer to another drawer. The invention contemplates any present or future node site upon which a node can be installed.

For simplicity, like elements (e.g., Processor 31A) are labeled the same in each node.

Nodes 38A and 38B each comprise more than one processor. Processors 31A and processor 31B are shown in each node; however node 38A (and node 38B) may comprise more than two processors coupled together on bus 35A and/or bus 35B (multiple processors coupled on busses 35A and 35B not illustrated). A single processor is shown coupled to bus 35A and to bus 35B for simplicity.

Processor 31A has at least one level of cache (e.g., L3 32A), and L3 32A is shown coupled to processor 31A. L3 32A could be a "level 3" cache, or any level of cache coupled to, or embedded within, processor 31A. Similarly, processor 31B is shown to have L3 cache 32B.

Processor 31A is coupled to memory controller 33 by bus 35A. Processor 31A sends requests for loads and stores to memory controller 33 over bus 35A, and receives or sends data associated with those requests over bus 35A. Although 31A is shown as a single processor coupled to bus 35A, more than a single processor could be coupled to bus 35A. As described earlier for a similar bus, if more than a single processor is coupled to bus 35A, the designer must consider the electrical topology complications in doing so, as well as the requirement for sharing the bus bandwidth of a bus between multiple processors. The present invention contemplates any number of busses from memory controller 33 to processors, each bus coupled to one or more processors.

Memory controller 33 is coupled by bus 40 to L4 memory 34. L4 Memory 34 is a relatively large amount of memory, compared to the cache memory of a processor, e.g., L3 32A. L4 Memory 34 is designed to be large enough to satisfy many, if not most, of the memory requests of the processors in the node; processor 31A and processor 31B, in the exemplary FIG. 2. L4 Memory 34 is addressed by an address space "owned" by the particular node.

Not all memory requests from a processor in a node in a multi-node system are typically satisfied by memory in that node. Some memory requests are in an address space "owned" by a different node in the computer system. For example, a request by processor 31A in node 38A might reference data held in L4 memory 34 in node 38B. Remote memory bus 39 couples memory controller 33 of node 38A with memory controller 33 of node 38B, and memory requests from node 38A to node 38B, or from node 38B to node 38A are satisfied by transmitting the associated requests and data over remote memory bus 39.

Figure 2:
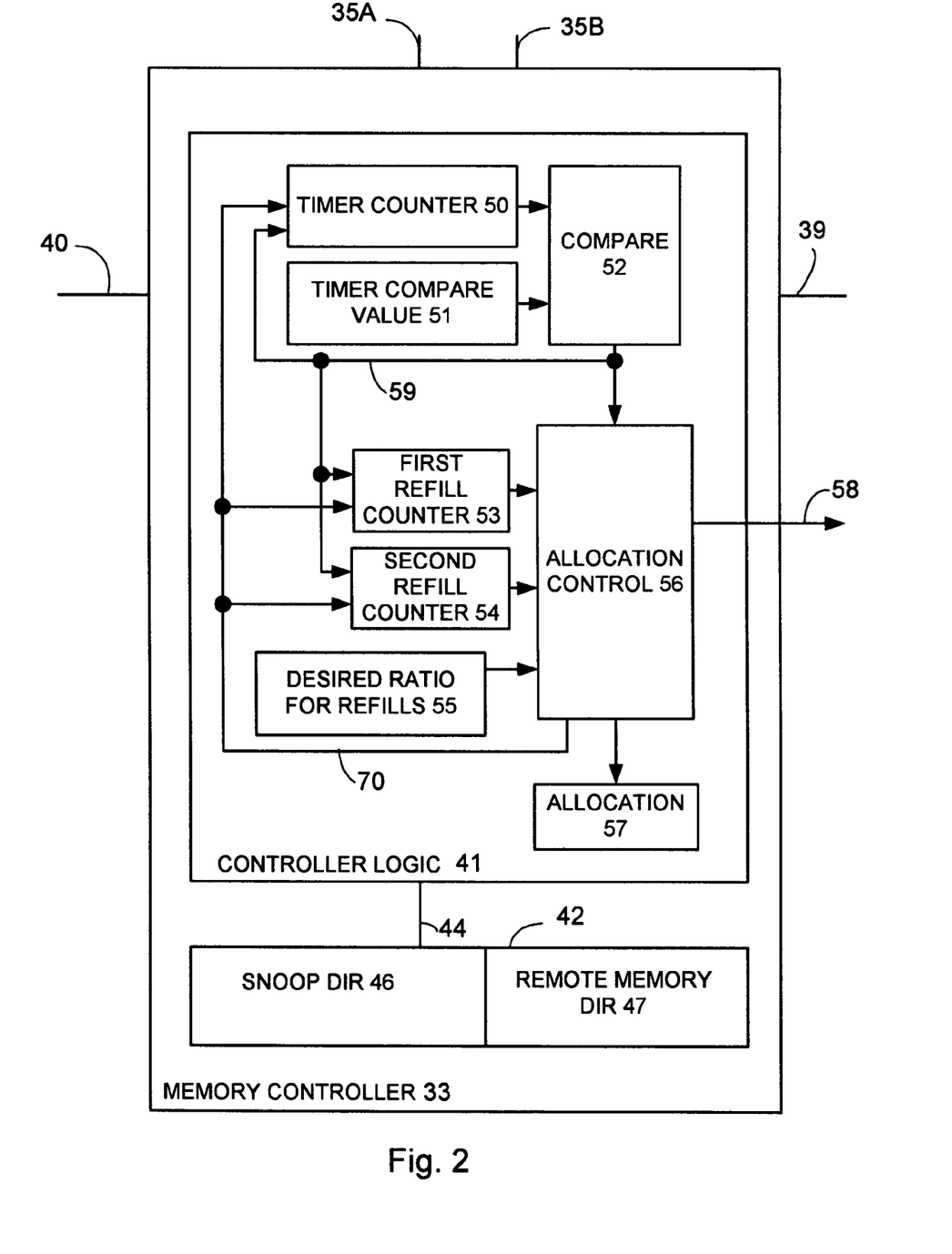
FIG. 2 shows a memory controller as described by the current invention, comprising a directory memory shared by a snoop directory and a remote memory directory, and controller logic.

FIG. 2 shows memory controller 33 in more detail.

Processor busses 35A and 35B, couple memory controller 33 to processors 31A and 31B as shown in FIG. 1. Bus 40 couples memory controller 33 to L4 memory 34 as shown in FIG. 1. Remote memory bus 39 couples memory controller 33 of one node to another memory controller 33 of another node, as illustrated in FIG. 1.

Of interest for understanding of the present invention is controller logic 41 which is coupled to directory memory 42 by bus 44. Controller logic 41 is coupled to memory controller 33. Controller logic 41 is shown as a part of memory controller 33, although in other embodiments (not shown), controller logic 41 is separate from memory controller 33 but coupled to memory controller 33. Controller logic 41 is aware of entry refill requests for both snoop directory 46 and remote memory directory 47. A directory entry refill occurs when a new directory entry is required for computer operation but there are no free entries available in the directory space available. An old entry is selected be cast out of the directory and the new entry required for operation is refilled in its position. Preferably, refills are monitored by controller logic 41 rather than misses to cover cases where invalid directory entries are available due to either previous invalidates or system start up—in those cases misses do not indicate the need for more directory entries. The blocks in controller logic 41 determine the allocation of directory memory 42 to snoop directory 46 and to remote memory directory 47.

Resettable timer counter 50 is a simple timer that, when enabled (unlocked), counts at a known rate, typically driven by a clock signal in the computer system. In an embodiment, resettable timer counter 50 counts up; in an alternative embodiment, resettable timer counter 50 counts down. Many types of resettable timer counters are known in the art, including, but not limited to, binary counters, gray code counters, and decimal counters. The present invention contemplates any type of resettable timer counter. Timer compare value 51 is a value representing a predetermined time interval. Timer compare value 51 is compared with the present contents of timer counter 50 by compare 52. Timer compare value 51, in an embodiment, is stored in a register set by an operating system. In another embodiment, timer compare value 51 is programmed into fuses in the computer system. In yet another embodiment, timer compare value 51 is simply designed into the logic elements of compare 52. Compare 52 asserts a signal 59 indicating when the time interval has elapsed. Signal 59 inhibits further counting by resettable timer counter 50.

The time interval is selected based upon how often changes in allocation of directory memory 42 is desired. A very short interval, such as an interval under 0.001 second, raises overhead penalties associated with reallocating the directory memory. A time interval of minutes reduces the responsiveness of the computer system to changing workload needs. Considering present computer speeds, a time interval of 0.001 second to 10 seconds is advantageously used. Any suitable time interval is contemplated by the present invention. The suitable time interval takes into consideration overhead of reallocation versus responsiveness of the computer system to changing workloads.

During the time interval (that is, the time between when timer counter 50 is enabled after a reset and the time that the contents of timer counter 50 is equal to timer compare value 51), a first refill counter 53 counts each time a snoop directory entry refill occurs. First refill counter 53 is halted when signal 59 is asserted, inhibiting further counting.

During the time interval, a second refill counter 54 counts each time a remote memory directory entry refill occurs. Second refill counter 54 is halted when signal 59 is asserted, inhibiting further counting.

A desired ratio for refills 55 is a preferred ratio of the total snoop directory entry refills to the total remote memory directory entry refills that occur during the predetermined time interval. Desired ratio for refills 55 is determined experimentally and/or theoretically for a particular computer system. For example, to experimentally determine desired ratio for refills 55, a number of values for desired ratio for refills 55 are tried, with computer throughput noted for each of the number of values. The value providing the highest throughput of the computer system is then selected as the desired ratio for refills 55, and is written into a register by the operating system. Theoretical determination of desired ratio for refills 55 is determined by many factors of a particular computer system, and entails detailed performance sensitivity knowledge of the particular computer system. In particular, the relative performance impact of a refill request for a remote memory directory entry is typically larger than the performance impact of a refill request for a snoop directory entry.

Allocation control 56 is alerted by signal 59 that the timer interval has elapsed (that is, the contents of timer counter 50 equals timer compare value 51). Allocation control 56 responds to the timer interval elapse by computing a first ratio of the number of snoop directory entry refill requests that occurred during the interval (that is, the value in first refill counter 53) to the number of remote memory directory entry refill requests that occurred during the interval (that is, the value in second refill counter 54). Allocation control 56 compares the first ratio with desired ratio for refills 55. Respondent to a ratio difference between the first ratio to the desired ratio for refills 55, allocation control 56 changes allocation 57, which is the relative allocation of directory memory 42 allocated to snoop directory 46 and remote memory directory 47. The change in allocation 57 is in a direction that will cause the first ratio to move closer to the desired ratio for refills in a subsequent time interval.

If an undesirably high number of snoop directory entry refills occurs relative to the number of remote directory entry refills occurs during a time interval, more space is allocated to snoop directory 46, and less space is allocated to remote memory directory 47. Allocation control 56, in a preferred embodiment, makes a relatively small change in allocation 57 after each timer interval elapse. In various embodiments 1%, 2%, 3%, 4%, 5% or 10% changes in allocation 57 are the maximum changes in allocation after a time interval has elapsed. Any predetermined fraction of remote memory directory 42 is contemplated as a maximum allocation change following elapse of a particular timer interval. In another embodiment, allocation is changed by some increment determined by a suitable memory granularity unit. Typically, in embodiments having relatively small allocation changes, some "hysteresis" is included to prevent "chatter" (small changes back and forth in the allocation) to eliminate constant reallocation that does not increase computer system throughput enough to justify the overhead involved in the reallocation. In another embodiment, the last value of allocation 57 is not considered, and the value of allocation 57 is determined only by the deviation of the computed ratio to desired ratio for refills 55.

Subsequent to making the change to allocation 57, allocation control 56 resets, using reset signal 70, timer counter 50, first refill counter 53, and second counter 54. Upon reset, the contents of timer counter 50 no longer compares equal to timer compare value 51. Compare 52 drops assertion of compare signal 59, and timer counter 50, first refill counter 53, and second refill counter 54 are thereby enabled.

Allocation bus 58 comprises one or more signals that, in an embodiment, communicates the first ratio and desired ratio for refills 55 to a computer program (not shown) that responds by setting allocation 57 to a new value, using allocation bus 58 to transmit the new value. The computer program is advantageously a part of the computer system operating system. In this embodiment, logic involved in setting allocation 57 is simply moved from hardware (i.e., allocation control 56) to the program. In yet another embodiment, the contents of first refill counter 53 and the contents of second refill counter 54 are sent to the computer program over allocation bus 58. The computer program then computes the first ratio. Desired ratio for refills is also sent to the computer program in a variant of this embodiment; in another variant, desired ratio for refills is stored in memory addressed by the computer program. The computer program computes a value for allocation 57 and transmits the value for allocation 57 over allocation bus 58 to memory controller 33. The computer program is distributed on computer-readable media. Many forms of computer-readable media currently exist, including, but not limited to, CD ROMs, floppy disks, magnetic tapes, and network connections such as the internet. The current invention contemplates any current or future computer-readable media suitable for distribution of a computer program.

Figure 3A:
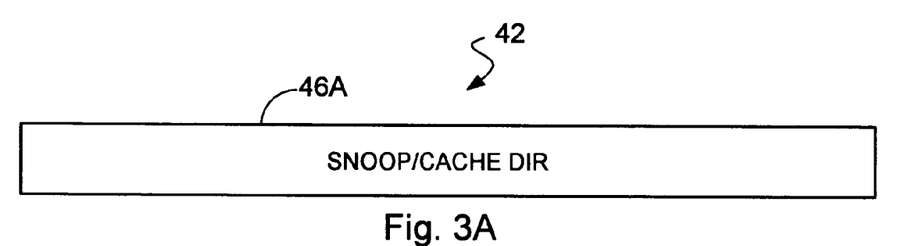
FIGS. 3A, 3B, and 3C show examples of the directory memory being partitioned into different sized allocations of the snoop directory and the remote memory directory.

FIG. 3A shows directory memory 42 devoted entirely to snoop directory 46A. Such an allocation would occur, for example, when only a single node is installed in the computer system. Since there is only one node, there will be no requests for remote memory directory entry refills. Allocation control 56 will respond to the difference between the computed ratio and the desired ratio for refills 55 by allocating more and more of directory 52 to snoop directory 46A.

Although snoop directory 46A is shown as totally consuming directory 42 in FIG. 3A, some small space may be reserved in case a refill request for a remote memory directory entry occurs. This could happen, for example, if the computer system were running programs with extremely good locality of reference, resulting in very infrequent refill requests for remote memory directory entries.

Figure 3B:
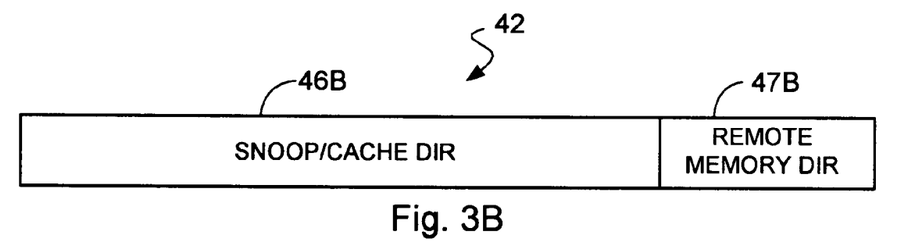

FIG. 3B shows a snoop directory portion 46B being relatively large compared to remote memory directory portion 47B. This allocation may occur in a two node system with relatively good locality of reference in the programs and data.

Figure 3C:
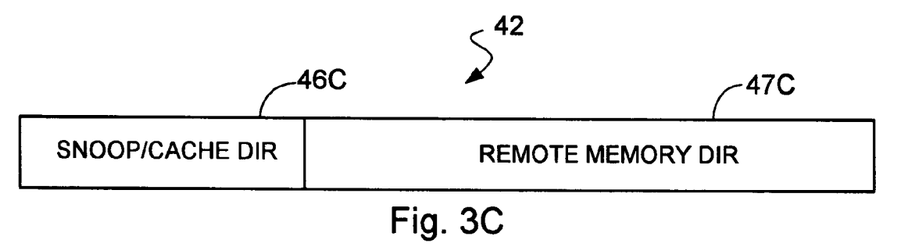

FIG. 3C shows a snoop directory portion 46C being relatively small compared to remote memory directory portion 47C. This allocation may occur in a computer system comprising more than two nodes and/or a computer system having relatively poor locality of reference in memory.

Table 1 gives an example of how a directory memory allocation is dynamically changed by the method taught in the present invention. The "time" column represents time intervals, rather than any particular time, e.g., seconds. The "snoop accesses" column shows the number of snoop directory entry refills that occurred during the interval. The "remote accesses" column shows the number of remote memory directory entry fills that occurred during the interval. The snoop allocation column shows the current allocation (fraction) of the directory memory to the snoop directory. The remote allocation shows the current allocation (fraction) of the directory memory to the remote memory directory. In the example, the snoop allocation and the remote allocation are shown initialized to 0.50 each; that is, half of directory memory is allocated to the snoop directory, and half of the directory memory is allocated to the remote memory directory. This "50/50" allocation may have been set by the operating system at bringup and the first table row would then represent the first time interval following bringup. The "50/50" allocation could also be the result of a period of entry refill activity in which (in the example) a like number of snoop directory entry refills and remote memory directory refills occurred prior to the first row of Table 1. In the example of Table 1, the snoop allocation and the remote memory allocation add up to 1.0 exactly. However, particular implementations may choose to leave a small portion of the directory memory unused, to simplify addressing, or to ease design effort in some other way. "Snoop refills" shows the number of snoop entry refills that occurred in the time interval. Similarly, "remote refills" shows the number of remote memory entry refills that occurred in the time interval. Snoop refills is the value in first refill counter 53 at the end of a timer interval; remote refills is the value in second refill counter 54 at the end of the timer interval. "Ratio" is the first ratio of the snoop refills to the remote refills. In the example, the desired ratio, (i.e., desired ratio for refills 55 in FIG. 2), is "1". As explained before, the desired ratio for refills 55 must be determined experimentally or theoretically. Depending on whether the first ratio is greater than or less than the desired ratio, the allocation is shifted in the example by 0.03 (that is, the snoop allocation is changed by 0.03 and the remote allocation is changed by 0.03 in the opposite direction). The amount of allocation change following a time interval can be any number, but is advantageously a relatively small fraction of the directory memory. As stated above, some fraction of directory memory 42 is advantageously reserved for remote memory directory 47 even if remote memory entry refills occur rarely.

TABLE 1

Example of changing allocation of a directory memory based on a computed ratio of snoop directory entry refills to remote memory directory refills. Allocation initialized to 0.5 to Snoop directory, 0.5 to Remote Memory Directory. The desired ratio is 1 in this example.

| Time | Snoop Ac- cesses | Remote Accesses | Snoop Allo- cation | Remote Allo- cation | Snoop Refills | Remote Refills | Ratio |
|---|---|---|---|---|---|---|---|
| 1 | 1000 | 500 | 0.50 | 0.50 | 550 | 275 | 2.0 |
| 2 | 1000 | 500 | 0.53 | 0.47 | 523 | 288 | 1.8 |
| 3 | 1000 | 500 | 0.56 | 0.44 | 496 | 302 | 1.6 |
| 4 | 1000 | 500 | 0.59 | 0.41 | 469 | 315 | 1.5 |
| 5 | 1000 | 500 | 0.62 | 0.38 | 442 | 329 | 1.3 |
| 6 | 1000 | 500 | 0.65 | 0.35 | 415 | 342 | 1.2 |
| 7 | 1000 | 500 | 0.68 | 0.32 | 388 | 356 | 1.1 |
| 8 | 1000 | 500 | 0.71 | 0.29 | 361 | 370 | 0.98 |
| 9 | 1000 | 500 | 0.71 | 0.29 | 361 | 370 | 0.98 |

There is some overhead associated with reallocating directory memory 42, changing the size of snoop directory 46 and remote memory directory 47. For example, if snoop directory 46 is being made smaller, in an embodiment, snoop directory entries in the portion being reallocated to remote memory directory 47 are cast out. The process of casting out directory entries takes some amount of time.

Advantageously, some predefined difference from desired ratio for refills 55 is required before a change in allocation is performed. Without this predefined difference, allocation of directory memory 42 may "chatter" back and forth with small changes given to one portion after one timer interval and taken back in the next timer interval. In Table 1, for example, no change in allocation is performed when the ratio is 0.98 (the desired ratio for the example of Table 1 is 1.0). The predefined difference chosen depends on how much overhead occurs on a given system in performing the reallocation of directory memory versus how much system throughput improvement is expected to be gained by performing the reallocation of directory memory. Although, in an embodiment, the predefined difference in one direction (e.g., the ratio difference is positive) differs from the predefined difference in the other direction (e.g., the ratio difference is negative), in another embodiment the predefined difference is the same in each direction.

Figure 5:
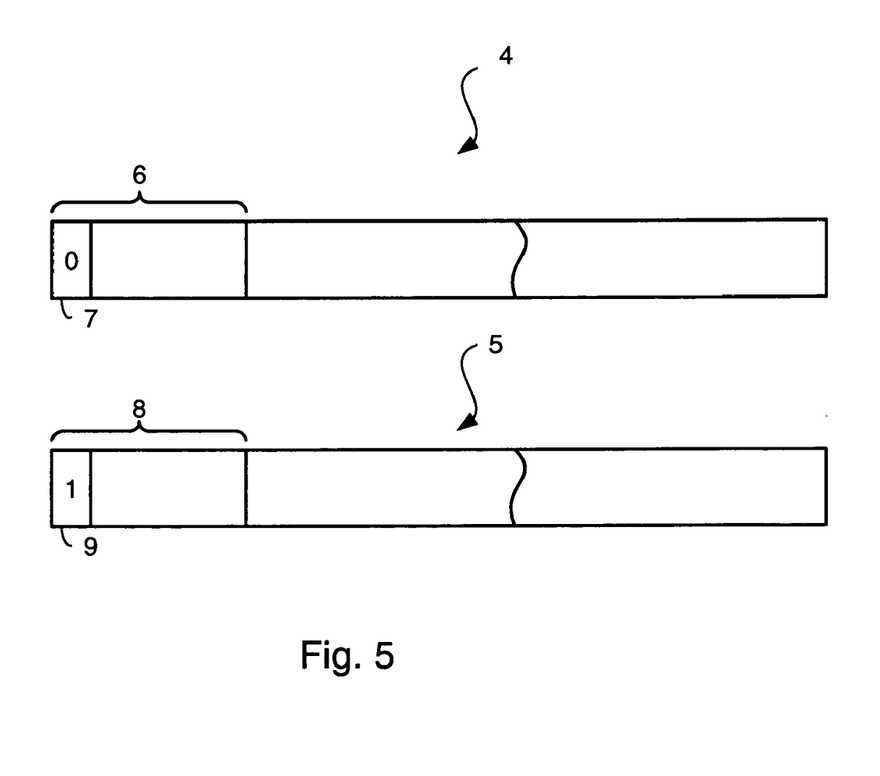
FIG. 5 shows examples of a snoop directory entry and a remote memory directory entry having information in control fields that identify each entry as a snoop directory entry or a remote memory directory entry.

Overhead can also be reduced using a technique shown in FIG. 5. FIG. 5 shows a more detailed view of snoop directory entry 4 and remote memory directory entry 5. In general, any directory entry has a control field which is typically used to store state information relevant to the particular entry. An extra field (one bit, in the example) is shown added to each entry's control field to store an entry type identifier. Snoop directory entry 4 has a snoop directory control field 6 which further comprises an entry type identifier 7 which, in the example, is set to "0". Remote memory directory entry 5 has a remote memory directory control field 8 which further comprises an entry type identifier 9 which, in the example, is set to "1". Advantageously, snoop directory entry 4 and remote memory directory entry 5 contain the same number of bits, facilitating easy replacement of one with the other. The entry type identifiers (i.e., entry type identifier 7 in snoop directory entry 4 and entry type identifier 9 in remote memory directory entry 5) are in the same position of the control field. With the entry type identifiers distinguishing each directory entry as an instance of snoop directory entry 4 or an instance of remote memory directory entry 5, entries need not be immediately cast out when a directory memory reallocation is performed. For example, if snoop directory 46 is logically reduced in size, with address range X to Y being reallocated to remote memory directory 47, there is no need to cast out all snoop directory entries 4 in address range X to Y immediately. However, no new instances of snoop directory entries 4 will be written into that address range (X to Y) during the current allocation of directory memory 42. If a remote memory directory entry 5 is to be placed at a particular address in address range X to Y, it will be placed there, with the snoop directory entry 4 at the particular address in the address range X to Y being replaced. There can be no uncertainty as to whether a particular entry is an instance of snoop directory entry 4 or a remote memory directory entry 5 because entry type identifiers 7 and 8 identify each entry.

Although, in FIGS. 2 and FIGS. 3A–30C directory memory is shown to be partitioned into snoop directory 46 (and 46A, 46B, 46C) and remote memory directory 47 (and 47B, 47C) the partitioning need not be by address range. If enough associativity is designed into directory memory 42 to allow sufficient granularity in allocation between snoop directory 46 and remote memory directory 47, allocation can be performed within the congruence classes in an associative memory directory. For example, if directory memory is eight-way set-associative, eight addresses can be placed in any of a congruence class of eight positions in the memory. In an embodiment, each congruence class is further allocated to a snoop directory portion and a remote memory directory portion. As before, in an embodiment, a control field in each directory entry contains an entry type identifier (e.g., snoop directory entry identifier 7 or remote memory directory identifier 8) that is advantageously used to identify entries that are instances of snoop directory entry 4 and remote memory directory entry 5. Use of the entry type identifiers eliminates the need to immediately cast out all instances of an entry type from space that has been reallocated to the other entry type.

Figure 4:
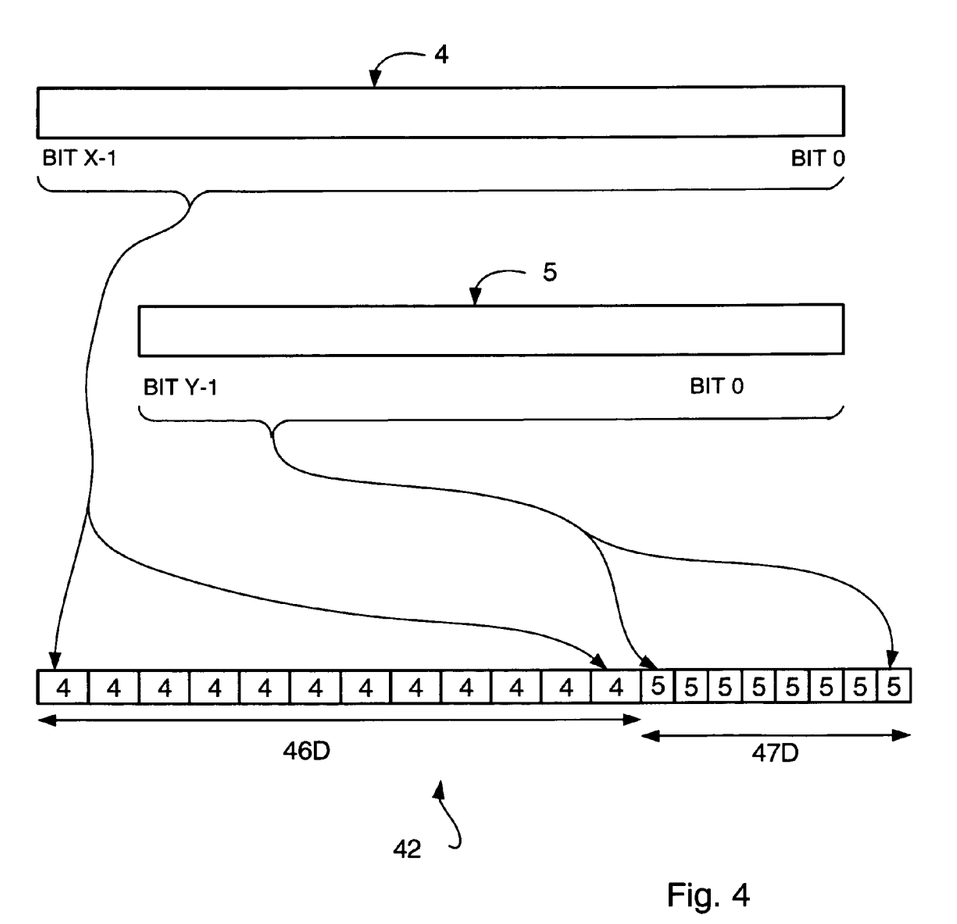
FIG. 4 shows a snoop directory portion having snoop directory entries and a remote memory directory portion having remote memory directory entries.

Although snoop directory entries and remote memory directory entries advantageously are the same size (i.e., have the same number of bits), in general they need not be the same size. FIG. 4 shows a snoop directory entry 4 having "X" bits and a remote memory directory entry 5 having "Y" bits. Multiple instances of snoop directory entries 4 are placed in snoop directory portion 46D of directory memory 42, and multiple instances of remote memory directory entries 5 are placed in remote memory directory 47D. However, if snoop directory entries are different sizes than remote memory directory entries, many complications in addressing and replacement must be dealt with by the system designer.

Figure 6:
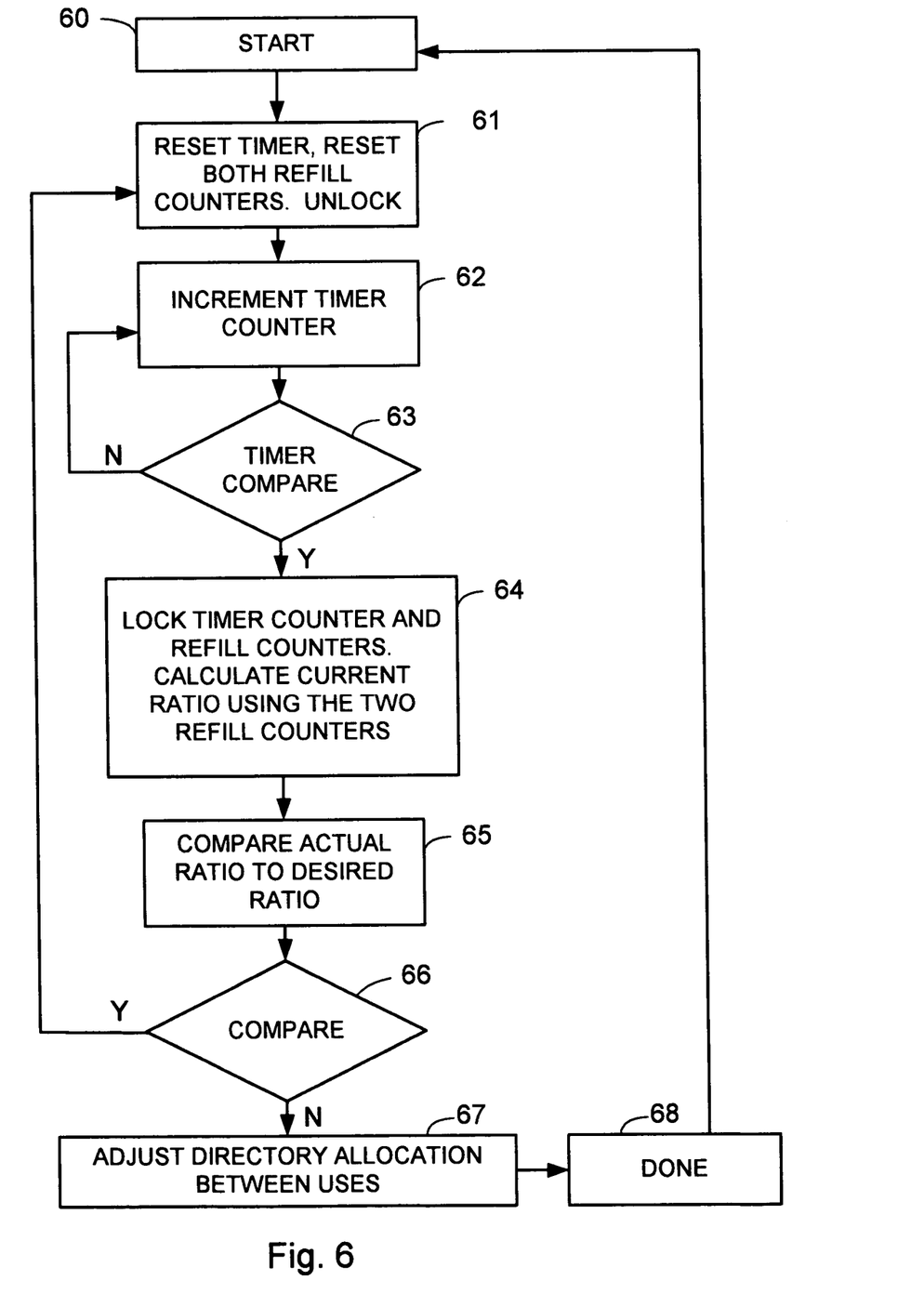
FIG. 6 shows a flow chart of a method to adjust allocation of a directory memory between a snoop directory portion and a remote memory directory portion.

FIG. 6 is a flowchart of a method that dynamically adjusts directory memory partition sizes between a snoop directory portion and a remote memory directory portion, respondent to changing patterns of snoop directory refills and remote memory directory refills.

Step 60 is the beginning of the method.

In step 61, a timer is reset, a first refill counter and a second refill counter are reset, and the timer and both refill counters are unlocked. The timer counts elapsed time in any convenient time increment. First refill counter is incremented each time a snoop directory entry refill occurs. Second refill counter is incremented each time a remote directory entry refill occurs.

In step 62, the timer is incremented. In step 63, the current value of the timer is compared with a predetermined value that is the time interval over which accumulations of snoop directory entry refills and remote memory directory entry refills are to be examined. If the time interval has not elapsed, control passes to step 62 for additional incrementing. If, however, the time interval has elapsed, control passes to step 64. In step 64, the timer counter is locked, preventing further counting. The two refill counters are also locked, preventing further accumulation of snoop directory entry refills and remote memory directory refills. A first ratio of snoop directory entry refills to remote memory directory entry refills during the time interval is computed.

In step 65, the first ratio is compared to a desired ratio. Step 66 controls how the process proceeds based on the compare results of step 65. If the first ratio is within predetermined differences from the desired ratio, no adjustment of the allocation of the directory memory is performed. If the ratio is not within predetermined differences from the desired ratio, control passes to step 67. If the difference of the ratio and the desired ratio exceeds a first predetermined difference, there exists an undesirably large number of snoop directory entry refills versus the number of remote memory directory entry refills, and a larger portion of the directory memory is allocated to the snoop directory. If the difference of the desired ratio and the first ratio exceeds a second predetermined difference, there exists an undesirably large number of remote memory directory entry refills versus the number of snoop directory entry refills, and a larger portion of the directory memory is allocated to the remote memory directory. The first and second predetermined differences are advantageously the same number, but do not have to be the same. The first and second predetermined differences must be determined experimentally or theoretically for any given computer system based on overhead penalties involved in changing allocation between the snoop directory and the remote memory directory versus throughput enhancements that would result from the change of allocation.

Following step 67, control passes to step 68 which completes an iteration through the method. Typically, the method is simply re-executed at the end of an iteration; that is, step 68 passes control back to step 60. Transition from step 68 back to step 60 is shown in FIG. 6.

The method described above can be implemented as a program product. A program product is a set of computer instructions that, when executed on a suitable computer, causes the method to be followed. The program product can exist on and be distributed on media that can be read by and executed by a suitable computer. Such media include but are not limited to CDROM disks, floppy disks, hard disks, and magnetic tape.

While the foregoing is directed to embodiments of the present invention, other and further embodiments of the invention may be devised without departing from the basic scope thereof, and the scope thereof is determined by the claims that follow.

What is claimed is:

1. A method for dynamically allocating directory memory in a node of a computer system, the directory memory comprising a snoop directory portion and a remote memory directory portion, the method comprising the steps of:

counting a number of snoop directory entry refills during a first time interval;

counting a number of remote memory directory entry refills during the first time interval;

determining a first ratio of the number of snoop directory entry refills during the first time interval to the number of remote memory directory entry refills during the first time interval; and allocating a first portion of a directory memory in the node to the snoop directory portion, and a second portion of the directory memory in the node to the remote memory directory portion, wherein the first ratio is a determinant of the sizes of the first portion and the second portion.

2. The method of claim 1, further comprising the steps of:
comparing the first ratio to a desired ratio;
increasing the first portion of the directory memory allocated to the snoop directory portion and decreasing the second portion of the directory memory allocated to the remote memory directory portion if the difference between the first ratio and the desired ratio exceeds a first predetermined value; and
increasing the second portion of the directory memory allocated to the remote memory directory portion and decreasing the first portion of the directory memory if the difference between the desired ratio and the first ratio exceeds a second predetermined value.

3. The method of claim 2,
wherein the step of increasing the first portion of the directory memory and decreasing the second portion of the directory memory increases the first portion and decreases the second portion by not more than a predetermined fraction of the directory memory; and
wherein the step of increasing the second portion of the directory memory and decreasing the first portion of the directory memory decreases the first portion and increases the second portion by not more than a predetermined fraction of the directory memory.

4. The method of claim 3, wherein the predetermined fraction of the directory memory is 10% or less of the directory memory.

5. The method of claim 1, the step of allocating the first portion of the directory memory in the node to the snoop directory portion, and the second portion of the directory memory in the node to the remote memory directory portion further comprises the steps of:
removing a cache directory address range from the first portion of the directory memory; and
casting out a snoop directory entry from the cache directory address range removed.

6. The method of claim 1, the step of allocating the first portion of the directory memory in the node to the snoop directory portion, and the second portion of the directory memory in the node to the remote memory directory portion further comprising the steps of:
removing a segment of a current cache directory address range of the first portion of the directory memory at the end of the first time interval;
adding only remote memory entry refills into the segment during a subsequent time interval;
writing information into each snoop directory entry instance identifying the snoop directory entry instance as a snoop directory entry; and
writing information into each remote memory directory entry instance identifying the remote memory directory entry instance as a remote memory directory entry.

7. The method of claim 1, the step of allocating the first portion of the directory memory in the node to the snoop directory portion, and the second portion of the directory memory in the node to the remote memory directory portion further comprising the steps of:
allocating a first portion of a congruence class in the directory memory to snoop directory entries; and
allocating a second portion of the congruence class in the directory memory to remote memory directory entries.

8. The method of claim 1, wherein the step of determining the ratio of the number of snoop directory entry refills to the number of remote memory directory entry refills during the time interval is performed by a computer program.

9. The method of claim 8, wherein the step of allocating a first portion of a directory memory in a node to a snoop directory portion, and a second portion of the directory memory in the node to a remote memory directory portion is performed by the computer program.

10. A computer system comprising:
one or more nodes, each node comprising more than one processor;
a directory memory in a particular node that is partitioned into a snoop directory portion and a remote memory directory portion;
a memory controller in the particular node capable of determining a number of snoop directory refills over a first time interval and determining a number of remote memory directory refills over the first time interval; and
an allocation control capable of making a change in a size of the snoop directory portion and a size of the remote memory directory portion respondent to the number of snoop directory refills and the number of remote memory directory refills at the end of the first time interval.

11. The computer system of claim 10, further comprising a desired ratio for refills;
wherein the desired ratio for refills is a predetermined target for a first ratio of the snoop directory refills over the predetermined time interval to the number of remote memory directory refills over the predetermined time interval.

12. The computer system of claim 11, wherein the allocation control computes the first ratio and, if a ratio difference between the first ratio and the desired ratio exceeds a predetermined value, makes the change in the size of the snoop directory portion and the size of the remote memory directory portion;
wherein the change in the size of the snoop directory portion and the remote memory directory portion is designed to reduce the ratio difference for a subsequent time interval.

13. The computer system of claim 12, further comprising:
a resettable timer counter, suitable for determining elapsed time;
a timer compare value that is preset to the predetermined time interval;
a first refill counter that is incremented each time a snoop directory refill occurs;
a second refill counter that is incremented each time a remote memory directory refill occurs;
a compare that is coupled to the resettable timer counter and the timer compare value and, respondent to an equal compare of a content of the resettable timer counter and the timer compare value, asserts a compare signal that is coupled to the allocation control, the timer counter, the first refill counter, and the second refill counter; the compare signal locking the timer counter, the first refill counter and the second refill counter;
wherein the allocation control, respondent to the compare signal being asserted, computes the first ratio, compares the first ratio to the desired ratio for refills to obtain the ratio difference, and, respondent to the ratio difference, makes the change in the size of the snoop directory portion and the remote memory directory portion; subsequent to making the change in the size of the snoop directory portion and the remote memory directory portion, the allocation control unlocks the timer counter, the first refill counter, and the second refill counter.

14. The computer system of claim 10 wherein the change in size of the snoop directory at the end of the time period is less than a predetermined fraction of the directory memory.

15. The computer system of claim 10, wherein the snoop directory portion is defined by a snoop directory portion address range, and the remote memory directory portion is defined by a remote memory directory address range; the allocation control capable making a change in a size of the snoop directory portion and a size of the remote memory directory portion by redefining the snoop directory portion address range and the remote memory directory portion address range.

16. The computer system of claim 10, wherein the snoop directory portion and the remote memory directory portion are defined as portions of congruence classes in a set-associative directory memory.

17. A computer program product that, when executed by a suitable computer having a node with a directory memory partitioned into a snoop directory portion and a remote memory directory portion, performs the steps of:

receiving information about the number of snoop directory entry refills in a node in a computer system over a predetermined time interval;

receiving information about the number of remote memory directory entry refills in a node in the computer system over the predetermined time interval;

computing an allocation of a directory memory in the node into the snoop directory portion and the remote memory directory portion, the allocation designed to cause a first ratio of the number of snoop directory entry refills to the number of remote memory entry refills toward a desired ratio for refills during a subsequent time interval; and transmitting the allocation to the node;

wherein the computer program product exists on a media that can be read by and executed by a suitable computer.

18. A computer-readable media containing a computer program product that, when executed by a suitable computer having a node with a directory memory partitioned into a snoop directory portion and a remote memory directory portion, performs the steps of:

receiving information about the number of snoop directory entry refills in a node in a computer system over a first time interval;

receiving information about the number of remote memory directory entry refills in a node in the computer system over the first time interval;

computing an allocation of a directory memory in the node into the snoop directory portion and the remote memory directory portion, the allocation designed to cause a first ratio of the number of snoop directory entry refills to the number of remote memory entry refills toward a desired ratio for refills during a subsequent time interval; and transmitting the allocation to the node.

* * * * *